US012346311B2

(12) United States Patent
Ivey et al.

(10) Patent No.: US 12,346,311 B2
(45) Date of Patent: Jul. 1, 2025

(54) ADAPTIVELY OVERLAPPING THE WRITING OF REDO LOG RECORDS

(71) Applicant: Oracle International Corporation, Redwood Shores, CA (US)

(72) Inventors: Graham Ivey, Hook (GB); Shih-Yu Huang, Mountain View, CA (US); Yunrui Li, Los Altos, CA (US); Shampa Chakravarty, Pleasant Hill, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/598,122

(22) Filed: Mar. 7, 2024

(65) Prior Publication Data
US 2025/0094411 A1 Mar. 20, 2025

Related U.S. Application Data (60) Provisional application No. 63/583,195, filed on Sep. 15, 2023.

(51) Int. Cl.
*G06F 16/00* (2019.01)
*G06F 16/23* (2019.01)
(52) U.S. Cl.
CPC ...... *G06F 16/2379* (2019.01); *G06F 16/2365* (2019.01)
(58) Field of Classification Search
CPC .......................... G06F 16/2379; G06F 16/2365
See application file for complete search history.

(56) References Cited

U.S. PATENT DOCUMENTS

| 10,169,054 | B2 * | 1/2019 | Dhupar | .................... G06F 9/451 |
| 11,580,110 | B2 * | 2/2023 | Chen | ........................ G06F 9/466 |
| 2004/0054643 | A1 * | 3/2004 | Vemuri | ............... G06F 16/2365 |
| 2005/0203961 | A1 * | 9/2005 | Mehra | ................. G06F 16/2358 |

(Continued)

*Primary Examiner* — Cheryl Lewis
(74) *Attorney, Agent, or Firm* — Hickman Becker Bingham Ledesma LLP (57) ABSTRACT

The present disclosure relates to adaptively overlapping redo writes. A log writer, while operating in a thin mode, may assign a first log writer group of a plurality of log writer groups to write one or more first redo log records to an online redo log in response to determining that a pipelining parameter is satisfied. The thin mode may be associated with one or more target sizes that are less than one or more target sizes associated with a thick mode. The log writer may determine to operate the thick mode based at least in part on at least a portion of the plurality of log writer groups being unavailable to write one or more second redo log records to the online redo log. The log writer, while operating in the thick mode, may assign a second log writer group of the plurality of log writer groups to write one or more second redo log records from the log buffer to the online redo log in response to determining that an amount of redo log records in the log buffer meets one of the one or more target sizes associated with the thick mode. The log writer, while operating in the thick mode, may assign a third log writer group of the plurality of log writer groups to write one or more second redo log records from the log buffer to the online redo log in response to determining that a highest busy group number meets or exceeds a core threshold.

20 Claims, 5 Drawing Sheets

(56) References Cited

U.S. PATENT DOCUMENTS

2006/0224634 A1* 10/2006 Hahn ................... G06F 16/2358
2013/0282666 A1* 10/2013 McGee ................. G06F 16/275
                                                    707/E17.005
2016/0179978 A1*  6/2016 Dhupar .................. G06F 9/451
                                                    707/683

* cited by examiner

ADAPTIVELY OVERLAPPING THE WRITING OF REDO LOG RECORDS

CROSS-REFERENCE TO RELATED APPLICATIONS; BENEFIT CLAIM

This application claims the benefit of Provisional Application 63/583,195, filed Sep. 15, 2023, the entire contents of which is hereby incorporated by reference as if fully set forth herein, under 35 U.S.C. § 119(e).

TECHNICAL FIELD

The present disclosure relates to write-ahead logging (WAL) and persisting redo log records.

BACKGROUND

A common approach to transaction logging in databases is to use write ahead logging (WAL). By guaranteeing that no changes are made to disk before the corresponding redo are written, WAL ensures the atomicity and durability components of the ACID (atomic consistent isolated durable) transaction properties needed in database systems. WAL facilitates high-performance database systems by providing in-place updates and eliminating a need to flush modified data pages to disk at each transaction commit.

However, state of the art WAL introduces latency during transaction commit, because the committing processes must wait for the log writer to complete, which is referred to as log file sync. Online transaction processing (OLTP) throughput in a database system is largely affected by the performance of logging of redo. Specifically, a transaction should wait for its redo to be persisted when the transaction commits, and this latency decreases throughput.

When writing redo log records from a log buffer to persistent storage, a log writer may employ parallelism to reduce latency. For example, the log writer may overlap (or "pipeline") redo writes using several log writer groups that may operate concurrently. A log writer group may include a collection of database processes that perform a "redo write" to persistent storage. One log writer group may begin writing one or more redo log records to persistent storage while another log writer group is already in the process of persisting its own redo log record(s). Thus, redo log records may be written to persistent storage more quickly than if the redo log records were being written using a single log writer group.

In practice, however, overlapping redo writes involves no more than two to four different log writer groups. Because of the small number of log writer groups used, and/or the use of a fixed-time delay when overlapping redo writes, a state-of-the-art computing device may be capable of generating redo log records faster than the log writer is capable of persisting them. Thus, once each available log writer group is busy persisting one or more redo log records, newly-generated redo log records will accumulate in the log buffer. Thus, a transaction commit may be delayed while the log writer waits for a log writer group to become available to write a portion of the accumulated redo log records. Each successive redo write will accordingly be larger and take longer to complete, thereby lengthening the delay. This problem is further exacerbated by "outlier" redo writes—redo writes that take significantly longer than expected—which tend to increase in frequency with larger redo writes.

Thus, approaches to overlapping redo writes are unable to adapt to differently-sized loads of redo, and especially larger loads. Medium to large loads may negatively affect performance even if significant computing resources are available. Likewise, the potential for high throughput in writing redo log records is limited.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to adaptively overlapping redo writes. To address performance issues with writing redo log records to persistent storage, multiple modes may be employed to adapt to differently-sized loads. In a thin mode, a log writer may use consistently small-sized redo writes overlapped over a large number of log writer groups. Thus, a greater number of log writer groups may be used to handle smaller redo writes with sizes consistently within a small range. Using a large number of log writer groups enables a high degree of overlapping redo writes. And by allocating redo log records among a large number of log writer groups, each individual redo write may be kept to a relatively small size. Smaller redo writes likewise result in a decreased incidence of outlier redo writes. In addition, the high degree of overlapping may result in a small optimal size range of redo writes than would result from using a lower degree of overlapping thin mode may be used for all but very heavy loads. During thin mode, a system may experience a large boost in performance compared to conventional approaches to handling redo writes.

In a thick mode, the log writer may use larger redo writes overlapped over a smaller number of log writer groups compared to thin mode. During thick mode, the log writer attempts to handle very heavy loads as best as it can under those circumstances. The log writer may attempt to constrain the sizes of redo writes if feasible, but both the size of redo writes and the number of log writer groups used may increase to handle even heavier loads. Thick mode may be used for very heavy loads that are not practicable to handle in thin mode. While thick mode may not offer the same performance improvements as thin mode, it does offer some increase in performance compared to conventional approaches to handling redo writes. Thick mode also enables greater control over the process of overlapping redo writes for very large loads than conventional approaches.

Example Database Management System

Figure 1:
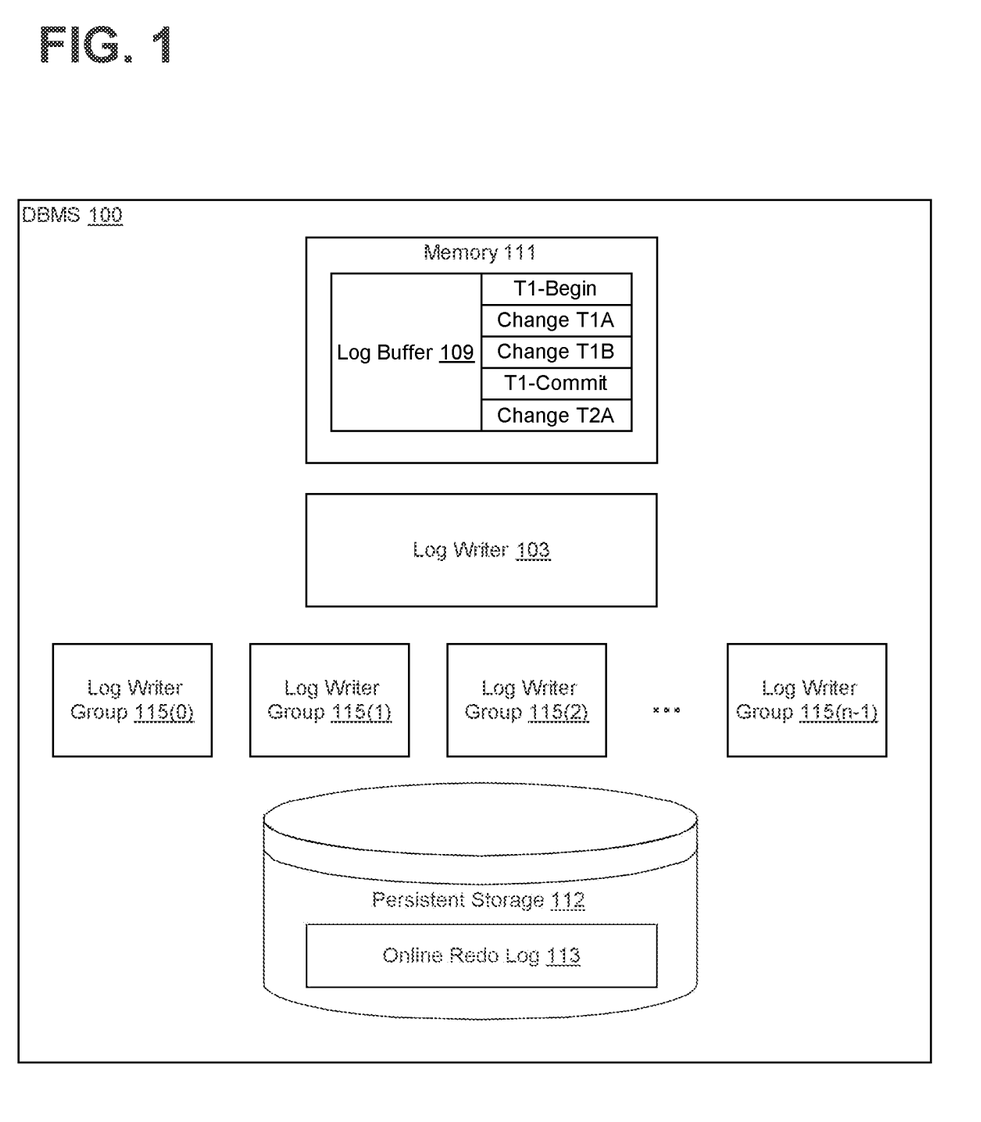
FIG. 1 is a block diagram illustrating an example database management system (DBMS) for adaptively overlapping redo writes, in an embodiment.

FIG. 1 is a block diagram illustrating an example database management system (DBMS) 100 for adaptively overlapping redo writes, in an embodiment. DBMS 100 is hosted on one or more computers that may each be a rack server such as a blade, a mainframe, a virtual machine, or other computing device.

DBMS 100 operates one or more databases such as a relational database that contains a relational schema, a database dictionary, and relational tables consisting of rows and columns stored in row major or columnar (i.e. column major) format in files that may consist of database blocks that each contain one or more rows.

The DBMS 100 includes a log writer 103 that writes one or more redo log records stored in a log buffer 109 residing in memory 111 to persistent storage 112 using a plurality of log writer groups 115(0) to 115(n−1) (collectively "log writer groups 115") in a database, where n is equal to a total number of log writer groups 115 in the DBMS 100.

In an embodiment, persistent storage 112 is a flash solid state drive (SSD), and the database resides in a disk drive or network attached storage (NAS). In an embodiment, the persistent storage 113 is a disk drive, and the database resides in NAS.

Database data in DBMS 100 is stored in data blocks in persistent storage 112. Database data is changed by first reading the data blocks from persistent storage 112 into in-memory buffers of the DBMS, modifying the data blocks in the buffers, and then rewriting the modified data blocks to persistent storage 112. The buffers are referred to herein as data block buffers. A copy of a data block stored in a data block buffer may be referred to as buffered data block. Redo is generated when modifying a buffered data block.

DBMS 100 stores redo generated for transactions in an online redo log (ORL) 113, which DBMS 100 uses for WAL. Because ORL 113 resides in persistent storage 112, an ACID transaction is durable if the transaction's changes to data blocks are recorded in redo stored in ORL 113, even if the changed data blocks have not been persistently written to the database. Latency of the transaction is decreased if the transaction is acknowledged as committed when all of the transaction's changes have been recorded in redo stored in ORL 113, which may be before the transaction's changes are persistently written to the database.

Volatile Buffering of Redo Records

Memory 111 cannot provide ACID durability, but log buffer 109 in memory 111 may provide further acceleration in ways somewhat similar or complementary to those of ORL 113. For example, changes represented by redo records T1A and T1B of transaction T1 and a change represented by redo record T2A of transaction T2 may be stored into log buffer 109 at three different respective times and then flushed together from log buffer 109 into ORL 113 in a single write. Thus, three writes to ORL 113 that would have been needed for three separate redo records may be replaced by only one write, which increases throughput.

Each of redo records T1A, T1B, and T2A may specify a result of a create read update delete (CRUD) operation on a single table row or database block. For example, redo record T1A may contain a row identifier (ROWID) or a logical block address (LBA), and may contain a byte offset or a field/column identifier, and may contain a new value to be written. Redo records T1-begin and T1-commit may demark written transaction T1 that is a sequence of changes.

Transaction Lifecycle

The lifecycle of a transaction may be a sequence of three phases. For example, the first phase of transaction T1 may be "uncommitted" (also referred to as "unready to commit"), which may entail generation and volatile buffering of redo records T1-begin, T1A, and T1B in log buffer 134. The second phase may be "committing" (also referred to as "ready to commit"), which may entail generation and volatile buffering of T1-commit. The third phase may be "committed", which may entail persistence of all changes of the transaction, regardless of whether or not the transaction's changes are written to the database.

The phased lifecycle of a transaction may be a logical pipeline of stages such that for various reasons different subsequences of changes in the transaction may simultaneously be in different respective stages of the pipeline (and different phases of the lifecycle). For example, simultaneously: a) redo record T1A may have already been applied to the database, b) ORL 113 may contain redo record T1B, and c) log buffer 109 may contain redo record T1-commit. In that case, the transaction itself may remain in the second phase (committing) because redo record T1-commit is not yet persisted.

Global Ordering

In an embodiment, DBMS 100 may assign each redo record a monotonically increasing timestamp or a system change number (SCN). The global ordering of redo records in a log buffer 109 means that for any given redo record stored in ORL 113, any redo record having an earlier SCN may be stored in the ORL 113. In some implementations, a transaction may be committed once all redo records having SCNs earlier than a transaction commit redo record T1-commit, and the transaction commit redo record itself, are persisted to the ORL 113. In addition, the redo records may be stored or otherwise accessible in SCN order.

Log Writer Groups

The log writer groups 115 may be ordinally numbered or otherwise labelled to indicate the order in which they are assigned redo writes—from 0 to 15 if there are 16 log writer groups 115, for example. In some implementations, the log writer 103 may assign a redo write to a lowest numbered log writer group 115. As an example, if log writer groups 115(0) and 115(1) are busy processing redo writes but log writer group 115(2) is not busy processing a redo write, the log writer 103 may assign a new redo write to log writer group 115(2). This remains true even if, for instance, log writer group 115(5) is also busy processing a redo write.

Thus, in many cases, a numerical value or other designation representing the highest-numbered log writer group 115 at a particular time—the "highest busy group number"—may indicate a business of the DBMS 100 overall. For example, if there are 16 log writer groups 115 and the highest busy group number is three, then log writer groups 115(0)-115(3) are probably busy (though not necessarily busy in the case of log writer groups 115(0)-115(2), as illustrated in the example above). In that example, the DBMS 100 is relatively inactive relative to the total number of log writer groups 115 since log writer groups 115(4)-115(15) are not busy processing redo writes.

Writing to the Online Redo Log

When preparing to assign one or more redo log records to a log writer group 115 to be written, the log writer 103 may "close the gate" on redo log records to be written. The redo log records then in the log buffer 109 may become a contiguous set of blocks in the ORL 113 when written by a log writer group 115.

Redo log records may be serialized within the log buffer 109. Likewise, redo log records may be written to the ORL 113 sequentially. Thus, when a log writer group 115 is assigned one or more redo log records to write, the log writer group 115 may write out its assigned batch of redo log records in sequence. When another batch of redo log records are then assigned to a next log writer group 115, those redo log records may be next in sequence to the previous batch of redo log records written to the ORL 113. Each log writer group 115 may include multiple subprocesses, each of which may be assigned a certain number of blocks of redo log records to write to the ORL 113.

A log writer group 115 may block off boundaries of a section of the ORL 113 to which the log writer group 115 will write. Because the log writer group 115 may only write redo log records to this section of the ORL 113, the log writer group 115 does not interfere with any other log writer groups 115, which may be writing to different sections the ORL 113. Multiple log writer groups 115 may therefore write to the ORL 113 concurrently.

Modes of Operation

The log writer 103 may operate in different modes depending on the load of redo log records handled by the DBMS 100 at a particular time. For most loads aside from very heavy loads, the log writer 103 may operate in thin mode. Thin mode may be characterized by small redo writes using as many of the log writer groups 115 as called for by a given load. For the heaviest loads, the log writer may operate in thick mode. Thick mode may be characterized by larger redo writes overlapped over a smaller set of the log writer groups 115 when compared with thin mode. In some implementations, both thin mode and thick mode may be subdivided into multiple "zones" that may vary the behavior of the log writer 103 during that particular mode based on various factors.

Thin Mode

During thin mode, the log writer 103 may allocate redo writes among as many log writer groups 115 as possible while maintaining a consistent, optimal, approximate size for the redo writes. That way, the log writer 103 may avoid waiting for a log writer group 115 to become available to process a new redo write—thereby reducing log file sync—unless and until all of the log writer groups 115 are busy when the log writer 103 attempts to assign a redo write.

In some implementations, thin mode may include multiple "zones" that dictate how the log writer 103 assigns redo writes to the log writer groups 115. Which of these zones the log writer 103 operates in at a particular time may depend on a current highest busy group number.

For example, the log writer 103 may operate in a "no-wait" zone when the highest busy group number is equal to zero or if no log writer groups 115 are busy. While operating in the no-wait zone, the log writer 103 may assign a redo write to the lowest available log writer group 115 immediately upon any redo log records being loaded into the log buffer 109. The no-wait zone ensures that the log writer 103 is responsive to transaction commits when the DBMS 100 is relatively quiescent.

As another example, the log writer 103 may operate in a "wait" zone if the highest busy group number is greater than zero. While operating in the wait zone, the log writer 103 may assign a redo write to a log writer group 115 when one or more pipelining parameters are satisfied. Assigning a redo write when one or more of the pipelining parameters are satisfied may result in redo writes that are at or near an optimal redo write size that can be handled by available log writer groups 115. The one or more pipelining parameters may include, for instance, a timeout threshold and an amount threshold.

According to the timeout threshold pipelining parameter, the log writer 103 may assign a new redo write to a log writer group 115 after a specified duration of time has elapsed since a most recent previous redo write. The value of the timeout threshold may vary based on the current highest busy group number—as the highest busy group number increases, the value of the timeout may increase as well. For example, if the highest busy group number is two meaning that the DBMS 100 is relatively inactive—then the timeout threshold might be 100 microseconds; but when the DBMS 100 is relatively active and the highest busy group number is fifteen, then the timeout threshold might be 750 microseconds. Thus, the log writer 103 may wait less time to assign redo writes in response to meeting the timeout threshold pipelining parameter when the DBMS 100 is relatively inactive. Likewise, the log writer 103 may wait more time to assign redo writes in response to meeting the timeout threshold pipelining parameter when the DBMS 100 is relatively active, thereby increasing the chance that the log writer 103 will assign redo writes in response to meeting the amount threshold pipelining parameter instead.

According to the amount threshold pipelining parameter, the log writer 103 may assign a new redo write to a log writer group 115 once a specified amount of redo log records has accumulated in the log buffer 109. The amount of accumulated redo log records that causes the log writer 103 to assign a redo write may be referred to as the "target size". The amount threshold may be equal to a target size for redo writes during thin mode. The amount threshold may be a total size of the accumulated redo log records in the log buffer 109 or a number of accumulated redo log records.

While the amount of accumulated redo log records may equal the target size when the log writer 103 assigns a redo write, that amount may have increased when the assigned log writer group 115 begins to process the redo write. Thus, the actual sizes of redo writes processed by the log writer groups 115 may deviate slightly from the target size but still remain consistently near the target size. This may be true when the log writer 103 is operating in both thin mode and in thick mode.

Thus, when operating in the wait zone of thin mode, the log writer 103 may assign a new redo write to a log writer group 115 when either one of these pipelining parameters has been met. If the time elapsed since a most recent previous redo write meets the timeout threshold, the log writer 103 may assign a new redo write to a log writer group 115 even if the amount of redo log records accumulated in the does not meet the amount threshold. Likewise, even if less time than the timeout threshold has elapsed since a most recent previous redo write, the log writer may assign a new redo write to a log writer group once the amount of accumulated redo log records meets the amount threshold.

Migration to Thick Mode

If the log writer 103 is no longer capable of handling a load while operating in thin mode, however, the log writer 103 may migrate to a thick mode. The log writer 103 may migrate to thick mode when the DBMS 100 is so active that no log writer group 115 is available to handle a new redo write. For example, the log writer 103 may migrate from thin mode to thick mode if the highest busy group number has been equal to the highest-numbered log writer group 115 during a predetermined number of consecutive attempts by the log writer 103 to assign a new redo write to a log writer group 115.

Thick Mode

While operating in thick mode, the target size of accumulated redo log records that causes the log writer 103 to assign a new redo write may be greater than or equal to a minimum size and less than or equal to a maximum size. The minimum target size and maximum target size for redo writes in thick mode may be, for example, 768 KB and 4 MB, respectively. By maintaining a target size for redo writes between the minimum target size and maximum target size, the log writer 103 may, despite a higher target size compared to thin mode, prevent outlier redo writes through consistent redo write sizes and thereby reduce latency. In some examples, the log writer 103 may use a portion of the log writer groups 115. Even with very large loads of redo log records to persist, the log writer 103 is unlikely to use a number of log writer groups 115 that is near the total number of log writer groups.

In some implementations, thick mode may include multiple "zones" that dictate to which log writer groups 115 the log writer 103 may assign redo writes, as well as whether the target size increases or decreases. Which of these zones the log writer 103 operates in at a particular time during thick mode may depend on a current highest busy group number.

For example, the log writer 103 may operate in a "core" zone when the highest busy group number is less than or equal to a predetermined core threshold. Thus, while operating in the core zone, the log writer 103 may use a subset of the log writer groups 115 according to the core threshold, referred to as the "target groups". Upon each attempt to assign a redo write to a log writer group 115 while operating in the core zone, the log writer 103 may decrease the target size for the redo writes (subject to the minimum target size and maximum target size), thereby resulting in smaller redo writes. The log writer 103 may decrease the target size by a predetermined value, which can be equal to 32 KB as one example. By iteratively decreasing the target size, the log writer 103 may eventually cause the target size to be small enough to be handled in thin mode.

As another example, when the highest busy group number is greater than the core threshold, the log writer 103 may operate in an "overflow" zone. In the overflow zone, the log writer 103 may assign new redo writes to log writer groups 115 outside of the core zone. While operating in the overflow zone, the log writer 103 may, upon each attempt to assign a redo write to one of the log writer groups 115, increase the target size for the redo writes by a predetermined value while still remaining between the minimum target size and the maximum target size inclusive, thereby resulting in larger redo writes. This predetermined value can be, for example, 32 KB. Iteratively increasing the target size for the redo writes may eventually result in the log writer 103 assigning new redo writes only to log writer groups 115 within the target zone. Because the log writer groups 115 are being assigned increasingly larger redo writes corresponding to the increasing target size, fewer groups may handle a given load. And when the highest busy group number accordingly becomes equal to or less than the core threshold, the log writer 103 may resume operating in the core zone.

Migration to Thin Mode

As an additional example, thick mode may also include a fallback zone. In some implementations, the fallback zone may be co-extensive with the core zone. While operating in the fallback zone, the log writer 103 can monitor the target size to determine when it is appropriate to migrate to thin mode. For instance, the log writer 103 may determine to migrate to thin mode if the target size for the redo writes has been equal to the minimum target size for a predetermined number of consecutive instances when assigning a new redo writes to log writer group 115. That is, if the respective target sizes for consecutive new redo writes have been equal to the minimum target size a predetermined number of times, then the log writer 103 may migrate back to thin mode. (If the predetermined number is one, then the log writer 103 may determine to migrate to thin mode when the target size for a new redo write has reached the minimum target size once). In some implementations, this minimum target size may be equivalent to a redo write size that thin mode may be capable of handling using a portion of the log writer groups 115. For example, given 16 log writer groups 115, the minimum target size of the target size may be equivalent to using 12 log writer groups 115 in this mode, for a highest busy group number of 11. Because the highest busy group number is not at the threshold for entering thick mode immediately after migrating to thin mode, the log writer 103 may avoid reverting to thick mode too quickly after migration.

Write-Ahead Logging Process During Thin Mode

Figure 2:
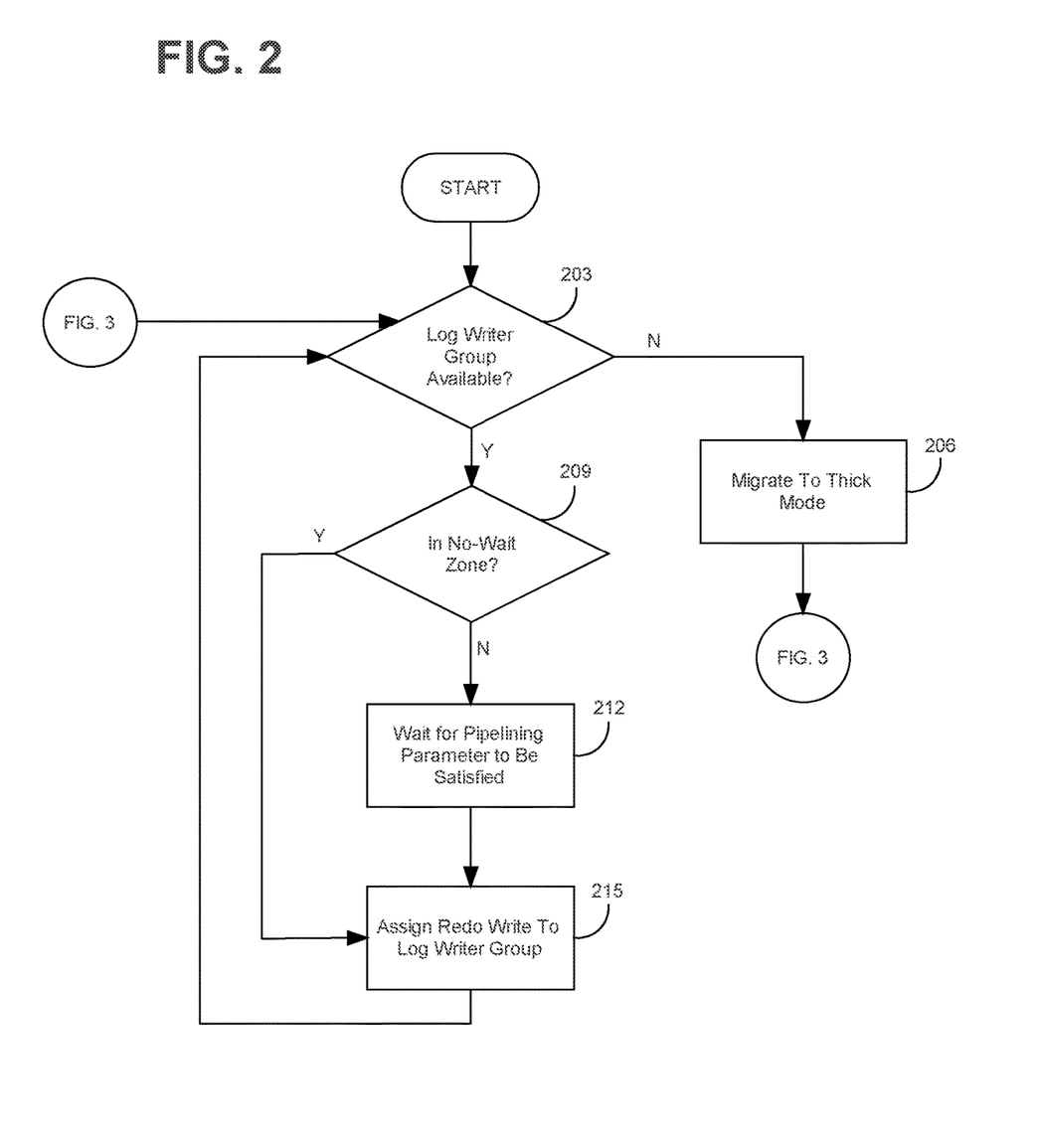
FIG. 2 is a flow diagram that depicts an example process performed by the log writer for write-ahead logging (WAL) while operating in a thin mode, in an embodiment.

FIG. 2 is a flow diagram that depicts an example process performed by the log writer 103 for write-ahead logging (WAL) while operating in a thin mode, in an embodiment. FIG. 2 is discussed with reference to FIG. 1 and FIG. 3. In some examples, the execution of the process depicted in FIG. 2 may begin following step 308 of FIG. 3.

At step 203, the log writer 103 determines whether a log writer group 115 is available to process a redo write from redo accumulated in the log buffer 109. For example, the log writer 103 may determine a highest busy group number, which represents the highest-numbered log writer group 115 that is currently processing a redo write. If the highest busy group number is less than the highest numbered log writer group 115, then a log writer group 115 is available to process the redo write. Execution may then proceed to step 209. On the other hand, if the highest busy group number is equal to the highest numbered log writer group 115, then no log writer group 115 is available to process the redo write. In that case, execution may proceed to step 206.

At step 206, the log writer 103 migrates from thin mode to operate in thick mode. If no log writer group 115 is currently available to handle the redo write, then the log writer 103 is no longer capable of operating in thin mode. Thick mode may enable the log writer 103 to better handle a large load of redo writes, albeit with lesser performance gains compared to thin mode. When migrating to thick mode, execution may proceed to step 306 of FIG. 3.

At step 209, the log writer 103 determines whether to operate in a wait zone or in a no-wait zone. The log writer 103 may operate in the no-wait zone if the highest busy group number is equal to zero or if no log writer groups 115 are busy. If the log writer 103 will operate in the no-wait zone, then execution may proceed to step 215. Otherwise, the log writer 103 may operate in the wait zone if the highest busy group number is greater than zero. If the log writer 103 will operate in the wait zone, then execution may proceed to step 212.

At step 212, the log writer 103 waits for a pipelining parameter to be satisfied. While operating in the wait zone, the log writer 103 may assign a redo write to a log writer group 115 when one or more pipelining parameters are satisfied. The one or more pipelining parameters may include, for instance, a timeout threshold and an amount threshold. The timeout threshold pipelining parameter may be satisfied once a specified duration of time has elapsed since a most recent previous redo write. The value of the timeout threshold may vary based on the current highest busy group number, with larger highest busy group numbers resulting in longer values for the timeout threshold. The amount threshold pipelining parameter may be satisfied when an amount of redo log records equal to the target size has accumulated in the log buffer 109. Once the log writer 103 determines that one of the pipelining parameters has been satisfied, execution may proceed to step 215.

At step 215, the log writer 103 assigns the redo write to one of the log writer groups 115. The log writer 103 may assign the redo write to the highest-numbered log writer group 115 that is not currently processing a redo write. Execution may then proceed back to step 203.

Write-Ahead Logging Process During Thick Mode

Figure 3:
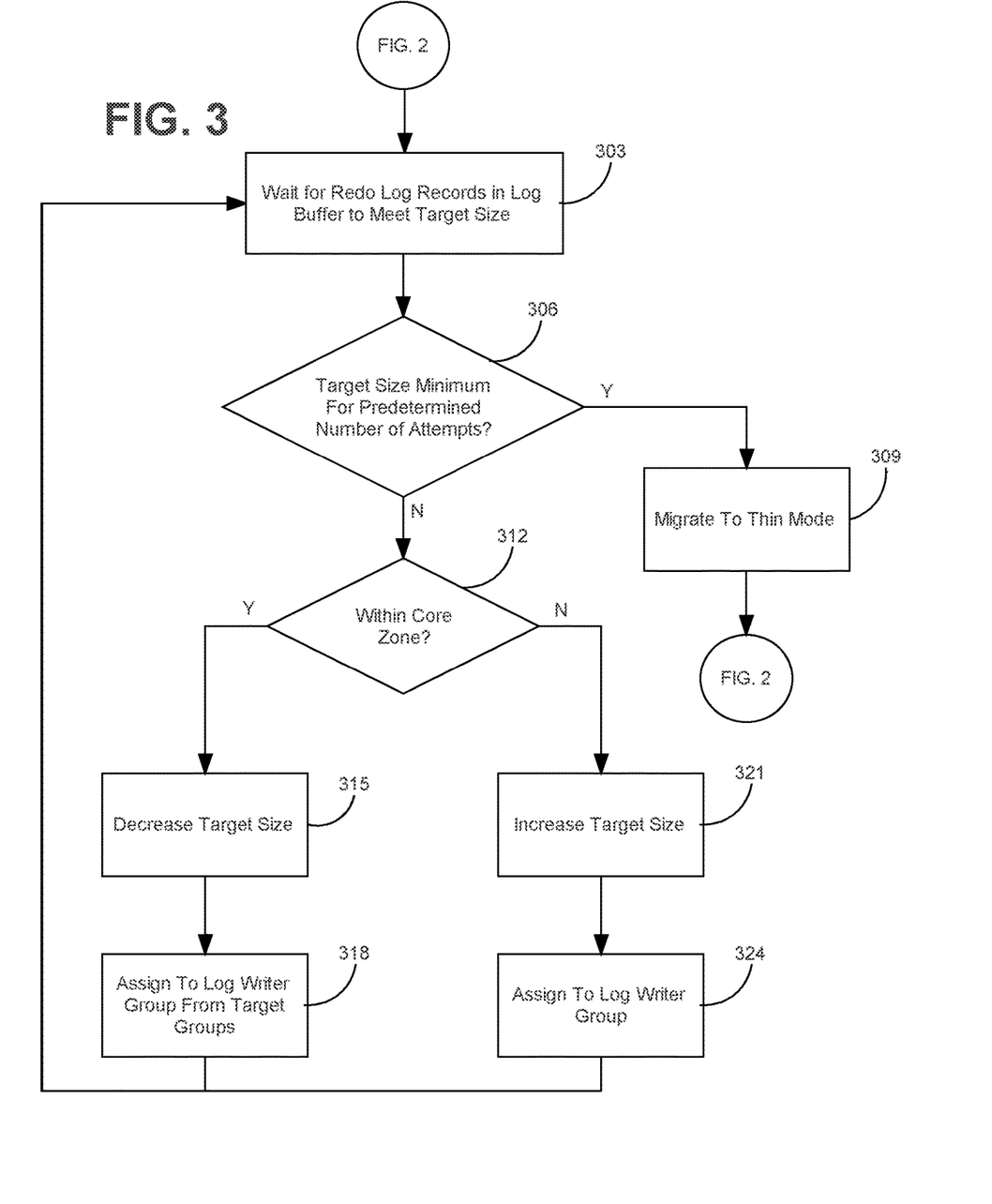
FIG. 3 is a flow diagram that depicts an example process performed by log writer 103 for write-ahead logging (WAL) while operating in a thick mode, in an embodiment.

FIG. 3 is a flow diagram that depicts an example process performed by log writer 103 for write-ahead logging (WAL) while operating in a thick mode, in an embodiment. FIG. 3 is discussed with reference to FIG. 1 and FIG. 2. In some examples, the execution of the process depicted in FIG. 3 may begin following step 206 of FIG. 2.

At step 303, the log writer 103 may wait for an amount of redo log records in the log buffer 109 to meet a current target size. Redo log records may accumulate in the log buffer 109 as transactions are carried out via the DBMS 100 and corresponding redo log records are generated. The target size may represent a number of redo log records accumulated in the log buffer 109 or a combined size of redo log records accumulated in the log buffer 109.

At step 306, the log writer 103 determines whether a target size for redo writes has been equal to a minimum target size during a predetermined number of consecutive attempts to assign a new redo write. If the target size has been equal to the minimum target size for the predetermined number of times, execution may proceed to step 309. Otherwise, execution may proceed to step 308.

At step 308, the log writer 103 may migrate from thick mode to operate in thin mode. If the log writer 103 can allocate redo writes among a large number of log writer groups, the log writer 103 may maintain a relatively small size for the redo writes. This may decrease the incidence of outlier redo writes. Thin mode may therefore result in better performance than thick mode. When migrating to thin mode, execution may proceed to step 206 of FIG. 2.

At step 309, the log writer 103 determines whether to operate in a core zone. The log writer 103 may operate in the core zone when the highest busy group number is less than or equal to a predetermined core threshold. On the other hand, the log writer 103 may operate in an overflow zone when the highest busy group number is greater than the core threshold. If the log writer 103 determines to operate in the core zone, execution may proceed to step 312. Otherwise, execution may proceed to step 318.

If the log writer 103 will operate in the core zone, then at step 312, the log writer 103 decreases the target size for redo writes. The log writer 103 may decrease the target size by a predetermined value, subject to a minimum target size. Decreasing the target size while operating in the core zone may result in progressively smaller redo writes so that the log writer 103 may eventually migrate to thin mode.

At step 315 the log writer 103 assigns the redo write request to one of the target groups. While operating in the core zone, the log writer 103 may assign the redo write to one of these target groups, which is a subset of the log writer groups 115. Execution may then proceed back to step 303.

Alternatively, if the log writer 103 will not operate in core zone, then at step 318 the log writer 103 increases the target size. In contrast to the core zone, while operating in the overflow zone, the log writer 103 may increase the target size for the redo writes by a predetermined value. The increased target size is subject to a maximum value, however. By increasing the target size in the overflow zone, redo writes may become progressively larger so that the log writer 103 may eventually re-enter the core zone.

At step 318, while in the overflow zone, the log writer 103 assigns the redo write request to one of the log writer group 115. In contrast with step 315, while operating in the overflow zone, the log writer 103 may assign the redo write request to any log writer group 115, including those that fall outside of the target groups. Execution may then proceed back to step 303.

DBMS Overview

A database management system (DBMS) manages a database. A DBMS may comprise one or more database servers. A database comprises database data and a database dictionary that are stored on a persistent storage mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g.

shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
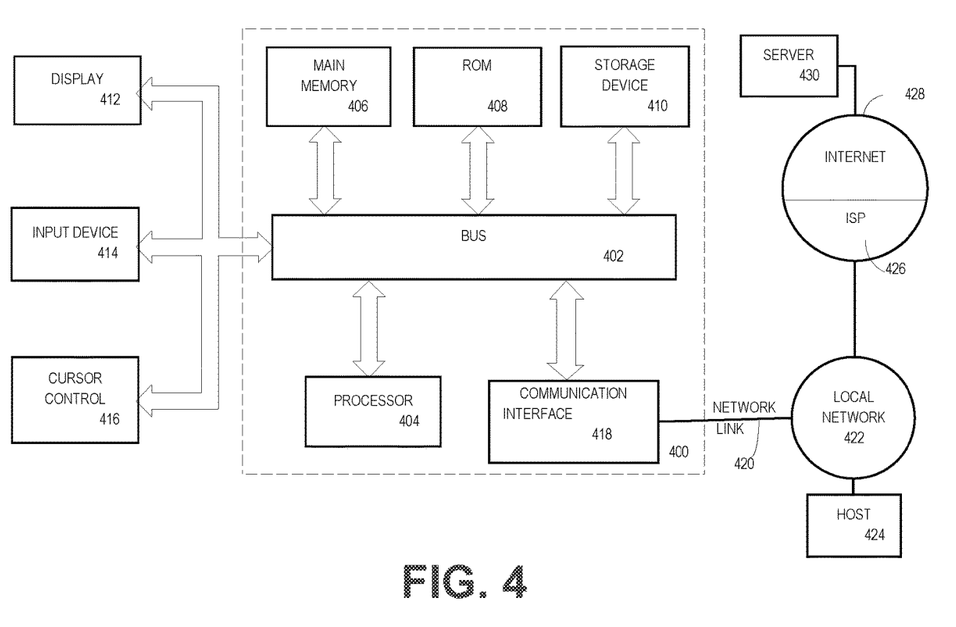
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
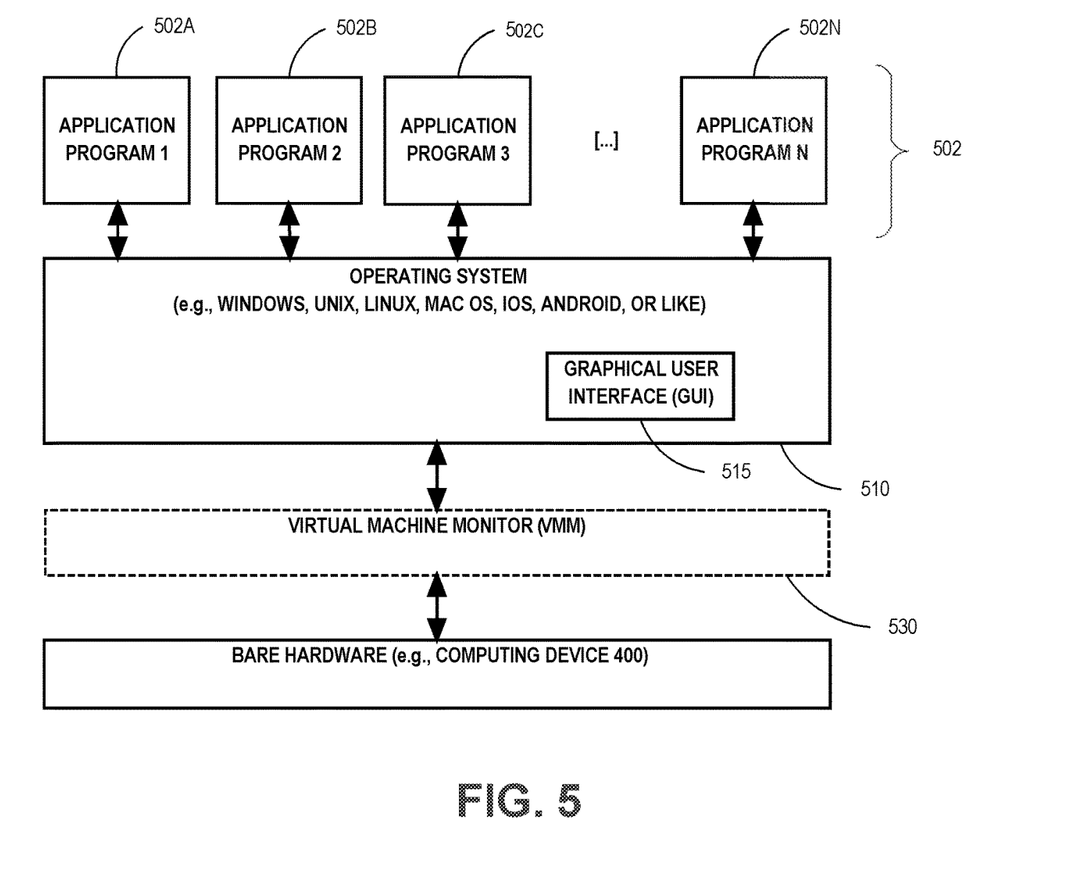
FIG. 5 is a block diagram of a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   assigning, by a log writer operating in a thin mode, a first log writer group of a plurality of log writer groups to write one or more first redo log records to an online redo log in response to determining that a pipelining parameter is satisfied;
   determining to operate the log writer in a thick mode based at least in part on at least a portion of the plurality of log writer groups being unavailable to write one or more second redo log records to the online redo log;
   assigning, by the log writer operating in the thick mode, a second log writer group of the plurality of log writer groups to write the one or more second redo log records from the log buffer to the online redo log in response to determining that an amount of redo log records in the log buffer meets one of one or more target sizes associated with the thick mode; and
   wherein the method is performed by one or more computing devices.

2. The method of claim 1, wherein determining that the pipeline parameter is satisfied further comprises determining that a period of time elapsed since a most recent previous redo write meets or exceeds a timeout threshold.

3. The method of claim 1, wherein determining that the pipeline parameter is satisfied further comprises determining that an amount of redo log records in the log buffer meets one of one or more target sizes associated with the thin mode, wherein the one or more target sizes associated with the thin mode are less than the one or more target sizes associated with the thick mode.

4. The method of claim 1, further comprising determining that the plurality of log writer groups are unavailable to write the one or more second redo log records to the online redo log based at least in part on the highest busy group number being equal to a highest-numbered log writer group among the plurality of log writer groups.

5. The method of claim 1, wherein the second log writer group is assigned, by the log writer operating in the thick mode, to write the one or more second redo log records from the log buffer to the online redo log in an instance in which the highest busy group number is within the core threshold.

6. The method of claim 1, further comprising, in an instance in which the highest busy group number is within the core threshold, determining, by the log writer operating in the thick mode, that the amount of redo log records in the log buffer meets a decreased target size of the one or more target sizes associated with the thick mode.

7. The method of claim 1, further comprising, in an instance in which the highest busy group number meets or exceeds the core threshold, determining, by the log writer operating in the thick mode, that the amount of redo log records in the log buffer meets an increased target size of the one or more target sizes associated with the thick mode.

8. The method of claim 1, wherein plurality of log writer groups are ordinally numbered, and the highest busy group number comprises a numerical value corresponding to a highest-numbered log writer group among the plurality of log writer groups that is currently writing one or more redo log records to the online transaction log.

9. The method of claim 1, further comprising determining to operate the log writer in the thin mode in response to determining that one or more respective target sizes of the one or more target sizes associated with the thick mode have equaled a minimum target size for a predefined number of redo writes.

10. The method of claim 1, further comprising assigning, by the log writer operating in the thin mode, a fourth log writer group of the plurality of log writer groups to write one or more fourth redo log records to the online redo log in response to determining that the highest busy group number is less than or equal to one.

11. One or more non-transitory storage media storing instructions which, when executed by one or more computing devices, cause:
   assigning, by a log writer operating in a thin mode, a first log writer group of a plurality of log writer groups to write one or more first redo log records to an online redo log in response to determining that a pipelining parameter is satisfied;
   determining to operate the log writer in a thick mode based at least in part on at least a portion of the plurality of log writer groups being unavailable to write one or more second redo log records to the online redo log; and
   assigning, by the log writer operating in the thick mode, a second log writer group of the plurality of log writer groups to write the one or more second redo log records from the log buffer to the online redo log in response to determining that an amount of redo log records in the log buffer meets one of the one or more target sizes associated with the thick mode.

12. The one or more non-transitory storage media of claim 11, wherein instructions causing determining that the pipeline parameter is satisfied, when executed by the one or more computing devices, further cause determining that a period of time elapsed since a most recent previous redo write meets or exceeds a timeout threshold.

13. The one or more non-transitory storage media of claim 11, wherein the instructions causing determining that the pipeline parameter is satisfied, when executed by the one or more computing devices, further cause determining that an amount of redo log records in the log buffer meets one of one or more target sizes associated with the thin mode, wherein the one or more target sizes associated with the thin mode are less than one or more target sizes associated with the thick mode.

14. The one or more non-transitory storage media of claim 11, wherein the instructions, when executed by the one or more computing devices, further cause determining that the plurality of log writer groups are unavailable to write the one or more second redo log records to the online redo log based at least in part on the highest busy group number being equal to a highest-numbered log writer group among the plurality of log writer groups.

15. The one or more non-transitory storage media of claim 11, wherein the second log writer group is assigned, by the log writer operating in the thick mode, to write the one or more second redo log records from the log buffer to the online redo log in an instance in which the highest busy group number is within the core threshold.

16. The one or more non-transitory storage media of claim 11, wherein the instructions, when executed by the one or more computing devices, further cause, in an instance in which the highest busy group number is within the core threshold, determining, by the log writer operating in the thick mode, that the amount of redo log records in the log buffer meets a decreased target size of the one or more target sizes associated with the thick mode.

17. The one or more non-transitory storage media of claim 11, wherein the instructions, when executed by the one or more computing devices, further cause, in an instance in which the highest busy group number meets or exceeds the core threshold, determining, by the log writer operating in the thick mode, that the amount of redo log records in the log buffer meets an increased target size of the one or more target sizes associated with the thick mode.

18. The one or more non-transitory storage media of claim 11, wherein plurality of log writer groups are ordinally numbered, and the highest busy group number comprises a numerical value corresponding to a highest-numbered log writer group among the plurality of log writer groups that is currently writing one or more redo log records to the online transaction log.

19. The one or more non-transitory storage media of claim 11, wherein the instructions, when executed by the one or more computing devices, further cause determining to operate the log writer in the thin mode in response to determining that one or more respective target sizes of the one or more target sizes associated with the thick mode have equaled a minimum target size for a predefined number of redo writes.

20. The one or more non-transitory storage media of claim 11, wherein the instructions, when executed by the one or more computing devices, further cause comprising assigning, by the log writer operating in the thin mode, a fourth log writer group of the plurality of log writer groups to write one or more fourth redo log records to the online redo log in response to determining that the highest busy group number is less than or equal to one.

* * * * *